United States Patent [19]

Kaneko

[11] Patent Number: 4,821,978
[45] Date of Patent: Apr. 18, 1989

[54] TWIN-BEARING TYPE FISHING REEL
[75] Inventor: Kyoichi Kaneko, Tokyo, Japan
[73] Assignee: Daiwa Seiko, Inc., Tokyo, Japan
[21] Appl. No.: 6,722
[22] Filed: Jan. 23, 1987
[30] Foreign Application Priority Data Jan. 31, 1986 [JP] Japan ............................. 61-12582[U]
Jun. 19, 1986 [JP] Japan ............................. 61-93885[U]
Jun. 19, 1986 [JP] Japan ............................. 61-93886[U]

[51] Int. Cl.$^4$ ............................................. A01K 89/00
[52] U.S. Cl. ........................ 242/84.1 R; 242/84.1 K
[58] Field of Search .................... 242/84.1 R, 84.1 J, 242/84.1 K

[56] References Cited

U.S. PATENT DOCUMENTS

| 437,627 | 9/1890 | Slote | 242/84.1 R |
| 720,063 | 2/1903 | Pflueger | 242/84.1 R |
| 820,609 | 5/1906 | Shakespeare, Jr. | 242/84.1 R |
| 1,321,284 | 11/1919 | Carter | 242/84.1 R |
| 1,977,142 | 10/1934 | Pflueger | 242/84.1 K |
| 2,327,431 | 8/1943 | Jicha | 242/84.1 K |
| 2,537,590 | 1/1951 | Kaufman | 242/84.1 R |

FOREIGN PATENT DOCUMENTS

60-0775 1/1985 Japan.
2158331 11/1985 United Kingdom ........... 242/84.1 R

Primary Examiner—Daniel P. Stodola
Attorney, Agent, or Firm—Kalish & Gilster

[57] ABSTRACT

A Twin-bearing type fishing reel is provided which comprises opposed side plates in planar parallel spaced-apart relationship with a spool extending therebetween for a fishing line. A finger rest is presented bridgingly between the plates, overlyingly of the spool and being integral with at least one of the plates. The plate with which said finger rest is integral and the finger rest are integrally molded of soft material capable of conforming respectively to the user's hand and thumb. A flexible rest cover is provided upon said finger rest.

9 Claims, 10 Drawing Sheets

TWIN-BEARING TYPE FISHING REEL

BACKGROUND AND SUMMARY OF THE INVENTION

The present invention relates in general to twin-bearing type fishing reels and, more particularly, such reels incorporating a unique integral finger rest.

Generally speaking, a twin-bearing type fishing reel attached to a casting handle or the like is manipulated, when it releases a fishing line, through the gripping of a knob located at the back of its mounted position. The winding action of the reel handle attached to the front of the grip requires the exertion of a strong force for maintaining the grip, partly because the fisherman's right and left hands are engaged at different positions and partly because the center of gravity is located at the front side. Therefore, most fishermen hold the casting handle and the reel in their palms and rest their thumbs on the struts, which are arranged forwardly of the spool shaft, so that the casting handle and the reel may be easily operated at the particular angle of elevation.

With this holding position, more specifically, the hand operating the handle of the reel and the hand holding the casting handle and the reel are located substantially in a common position to facilitate operation.

If, however, the thumb is forced to rest on the narrow reel strut, there arises a problem in that such forced position causes pain so that it is difficult to apply the thumb for a extended period of time.

In order to solve this problem, there has been invented a twin-bearing type fishing reel which is formed with a finger rest for resting the thumb between a handle-side outer plate and an opposite-side outer plate.

Since, however, the twin-bearing type fishing reel of the prior art contained an independently constructed finger rest, there arises an assembly problem requiring a number of steps for integrating such rest. Because of the individual, independent construction, a step or gap would be formed between the opposite-side outer plate, acting as an abutting member for the thumb, and the finger rest to raise another problem in that thumb pain is developed when gripping for a reasonable time is required.

In this twin-bearing type fishing reel of the prior art, moreover, both the opposite-side outer plate contacting with the palm and the finger rest, when the reel is gripped together with the fishing rod, are molded of a hard material such as aluminum, another metal or a synthetic resin. As a result, the outer plate and the finger rest present hard, unyielding surfaces for the palm and the thumb, and those members are relatively slidable so that the reel has to be strongly gripped in the event the hooked fish is to be landed. This hard grip will cause pain in the palm, contacting the outer plate, and especially to the ball and bulb of the thumb contacting the finger rest. Still worse, the engaged palm and thumb may possibly be caused to swell, and the hand is most apt to be quickly fatigued. These raise other problems caused by the reeling and fishing actions so that the reel cannot be gripped for a long period of time.

It is an object of the present invention to solve the above-described problems and disadvantages by providing a twin-bearing type fishing reel which requires relatively reduced assembling steps and is capable of freeing the thumb from pain even if the reel is gripped for a long time.

Another object of the present invention is to provide a twin-bearing type fishing reel which can provide a soft, comfortable contacting surface when it is gripped, and therefore improve grippability.

Still another object of the present invention is to provide a twin-bearing type fishing reel which forms a slip-preventing depression at will in a position fitted to the thumb of a fisherman and is soft and yielding in contact.

Since the finger rest is molded integrally with the opposite-side outer plate of a fishing reel, according to the present invention, it is unnecessary to assemble the finger rest as a single or independent component and thereby effect a reduction in the assembling steps. Since, moreover, neither step nor gap is formed between the opposite-side outer plate and the finger rest, the thumb is not subjected to pain even if the gripped portions are held for long period of time.

According to the present invention, the opposite-side outer plate and the finger rest to be contacted by the palm and the thumb when the reel is gripped are molded of a soft material such as a thermoplastic elastomer. As a result, if it is necessary to apply pressure through the palm and the thumb, the said plate and rest are elastically deformed according to the magnitude of the applied pressure thereby accomodating the palm and thumb so that the reel can be gripped with far less pain and normally resulting fatigue.

Furthermore, the finger rest can be formed with a slip-preventing recess suited to the finger tip merely by resting and pressing the thumb gripping the reel. As a result, the finger rest can be fitted to the size of the hand and the length of the fingers of the fisherman and soften the contact with the fingers so that the grippability of the reel is improved.

DESCRIPTION OF THE PRACTICAL EMBODIMENTS

The present invention will be described hereinbelow in detail in connection with the various embodiments thereof with reference to the accompanying drawings.

Figure 1:
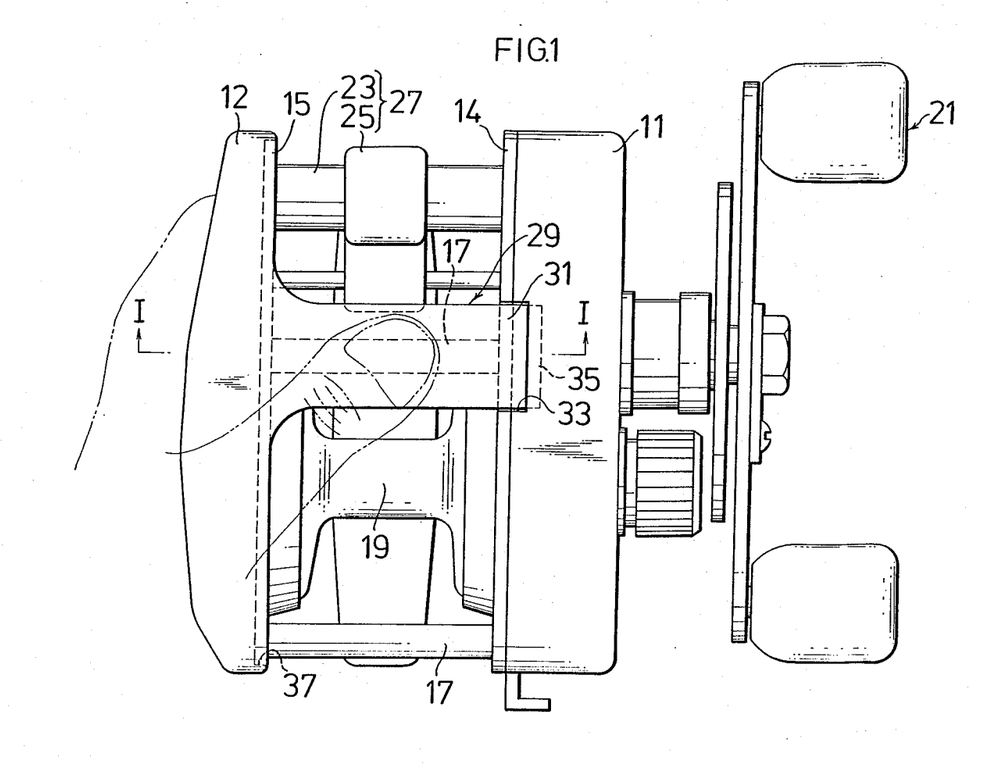
FIG. 1 is a top plan view of the first embodiment of a twin-bearing type fishing reel constructed in accordance with and embodying the present invention.

FIG. 1 shows the first embodiment of the twin-bearing type fishing reel of the present invention wherein a handle-side outer plate 11 and an opposite-side outer plate 12 ar arranged to face each other with a predetermined spacing therebetween. On the inner sides of the handle-side outer plate 11 and the opposite-side outer plate 12, there are disposed a handle-side frame 14 and an opposite-side frame 15, respectively, which are equidistantly held by a plurality of struts 17. Between the handle-side frame 14 and the opposite-side frame 15, there is interposed a spool 19 which is so borne by the handle-side outer plate 11 and the opposite-side outer plate 12 that it can be rotated by means of a gear train mechanism and a clutch mechanism, although these are not shown. Between the handle-side frame 14 and the opposite-side frame 15, there is interposed a level winder 27 which is comprised of a guide sleeve 23 and a fishline guide member 25.

Thus, in this embodiment, a finger rest 29 is formed integrally with the opposite-side outer plate 12 in a position on the outer circumference of such one of the struts 17 as is arranged above the spool 19 and in front of the shaft of the spool 19.

Figure 2:
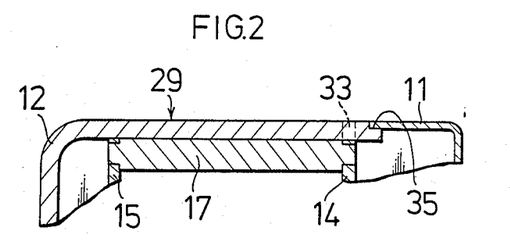
FIG. 2 is a longitudinal sectional view taken on the line II—II of FIG. 1.

The finger rest 29 is presented with the handle-side portion 31 thereof fitted in a recess 33 formed in the handle-side frame 14. The handle-adjacent end of finger rest 29 is formed, (see FIG. 2), with an upwardly and laterally opening notch 35, for accepting the proximate edge portion of side plate 11. Frame 15 is fittedly received as shown in FIG. 1, in a recess 37 provided in outer plate 12.

The twin-bearing type fishing reel thus constructed is assembled, (see FIG. 3), by presenting spool 19 between frames 14 and 15, then inserting the frame 15 into recess 37 of plate 12 with which finger rest 29 is integrally formed, and fastening the plate 12 to frame 15 by means of screws 39.

Figure 3:
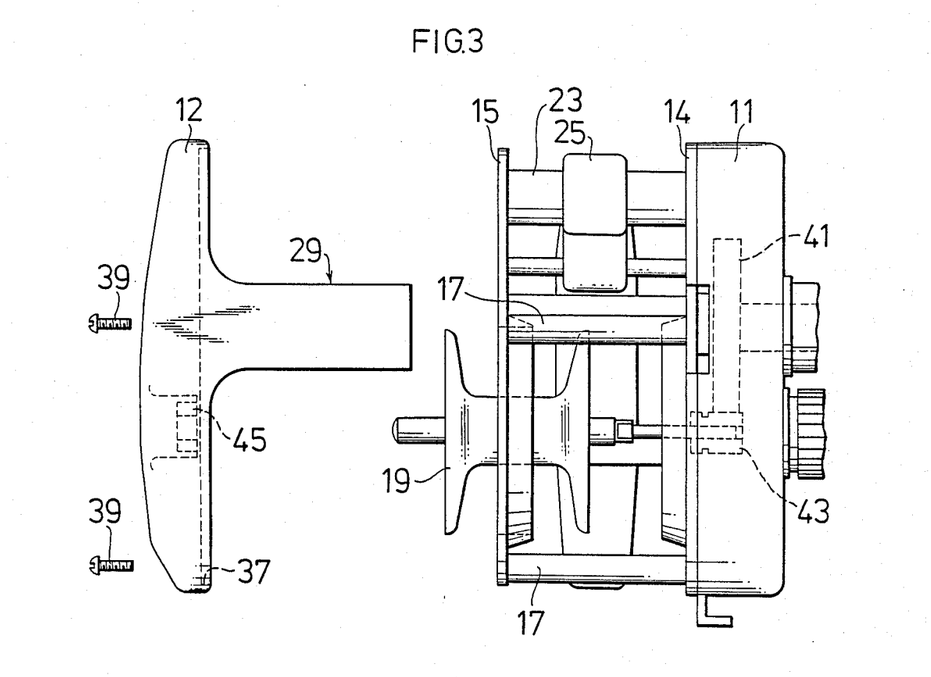
FIG. 3 is an exploded view illustrating the method of assembling the twin-bearing type fishing reel shown in FIG. 1.

Incidentally, in FIG. 3, 41 denotes a drive gear to be rotated by handle 21, and 43 designates a pinion meshing with drive gear 41. Moreover, 45 denotes a bearing which is arranged in plate 12 for journalling of spool 19.

Since the twin-bearing type fishing reel according to the present invention has its finger rest 29 molded integrally with plate 12, finger rest 29 need not be assembled as an independent undivided single part thereby reducing the assembling steps which had been required heretofore. As neither a step nor a gap is formed between the plate 12 and finger rest 29, the operator's finger will not be subjected to pain even if those parts are gripped for a long time, as shown in FIG. 1.

Figure 4:
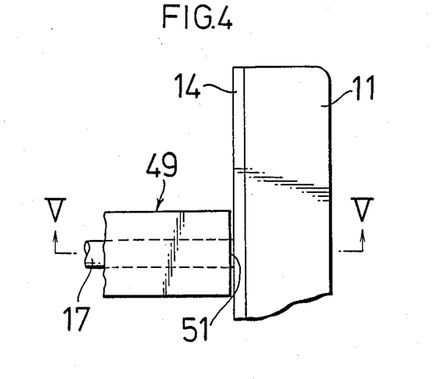
FIG. 4 is a fragmentary top plan view illustrating the finger rest of a second embodiment of a twin-bearing type fishing reel constructed in accordance with and embodying the present invention.
Figure 5:
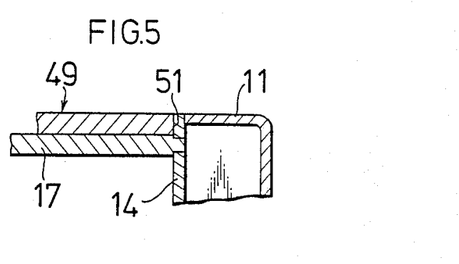
FIG. 5 is a longitudinal sectional view taken on the line V—V of FIG. 4.

FIGS. 4 and 5 show the handle adjacent portion of a finger rest 49 of a second embodiment of the present invention. In this embodiment, the end 51 of finger rest 49 proximate the handle abuts against the inner side face of frame 14 and is supported by the adjacent strut 17. In this embodiment, too, it is possible to obtain effects similar to those attainable by the twin-bearing type fishing reel shown in FIG. 1. As in this embodiment, finger rest 49 need not be fitted on outer plate 11, the improved efficiency in assembly can be achieved. Incidentally, in this and the following embodiments, the same parts as those of the twin-bearing type fishing reel shown in FIG. 1 are denoted by the same reference numerals, and their detailed descriptions will be omitted.

Figure 6:
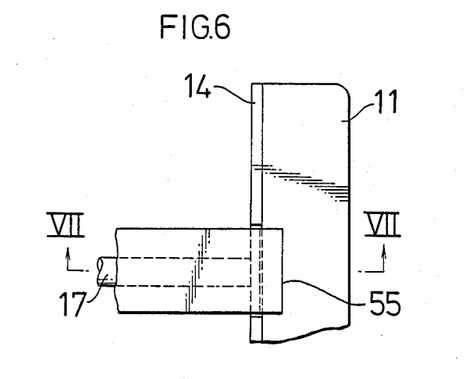
FIG. 6 is a fragmentary top plan view illustrating the finger rest of a third embodiment of a twin-bearing type fishing reel constructed in accordance with and embodying the present invention.
Figure 7:
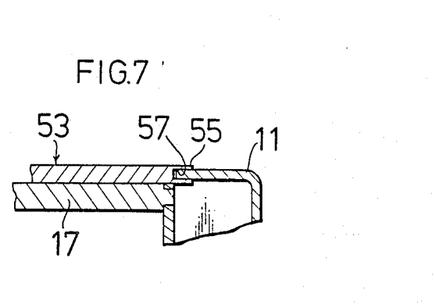
FIG. 7 is a longitudinal sectional view taken on the line VII—VII of FIG. 6.

FIGS. 6 and 7 show the handle adjacent portion of a finger rest 53 according to the third embodiment of the twin-bearing type fishing reel of the present invention. In this embodiment, said rest 53 is provided in its handle proximate end 55 with an endwise opening 57 in which the adjacent inner edge of plate 11 is fitted. In this embodiment, too, effects similar to those of the twin-bearing type fishing reel shown in FIG. 1 can be attained. It will be seen that finger rest 53 is thus received on plate 11, so that rigidity is enhanced.

Figure 8:
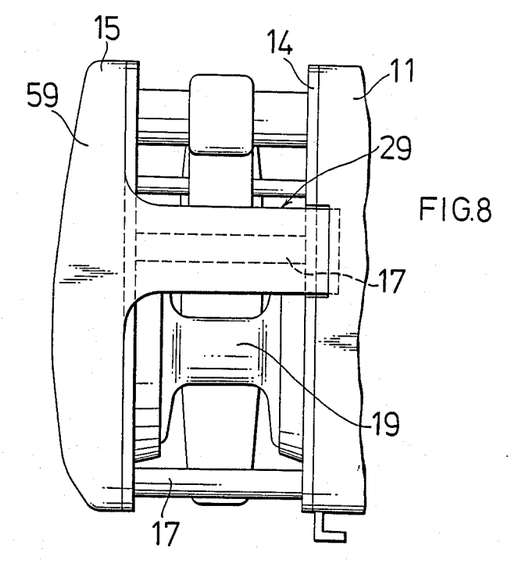
FIG. 8 is a fragmentary top plan view of a fourth embodiment of a twin-bearing type fishing reel constructed in accordance with and embodying the present invention.

FIG. 8 shows the fourth embodiment of the present invention, in which an opposite-side outer plate 59 abuts its inner side against the outer side of frame 15. In this embodiment, too, effects similar to hose of the twin-bearing type fishing reel shown in FIG. 1 can be attained. In this embodiment, plate 59 and frame 15 need not be inter-fitted thereby effecting greater efficiency in assembly.

Figure 9:
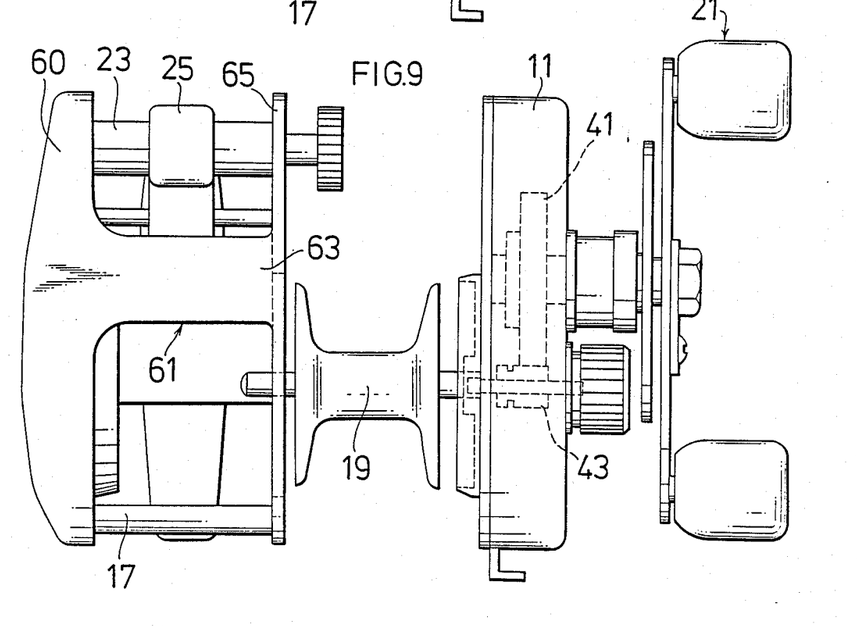
FIG. 9 is a top plan, exploded view of a fifth embodiment of a twin-bearing type fishing reel constructed in accordance with and embodying the present invention.

FIG. 9 shows a fifth embodiment of the present invention, in which a finger rest 61 is molded integrally with an opposite-side outer plate 60 and having the handle adjacent end 63 thereof molded integrally with a handle-side frame 65. Thus, the opposite-side frame is omitted. In this embodiment effects similar to those of the twin-bearing type fishing reel shown in FIG. 1 can be attained, and the integration of rest 61 with frame 65 further enhances the rigidity of the structure.

According to the first to fifth embodiments of the present invention, as has been described hereinbefore, the finger rest is molded integrally with the opposite side outer plate so that the number of assembling steps can be relatively reduced. Since neither step nor ga is formed between the opposite-side outer plate and the finger rest, the fisherman will not experience pain from his palm and/or thumb eve if he strongly grips those portions for a long time for winding and for releasing the fishline. Since, moreover, the opposite-side outer plate and the finger rest can be held snugly by the palm and the thumb, it is advantageously possible to endow a twin-bearing type fishing reel with improved grippability.

FIGS. 10 to 14, inclusive, show a sixth embodiment of a twin-bearing type fishing reel according to the present invention.

Figure 10:
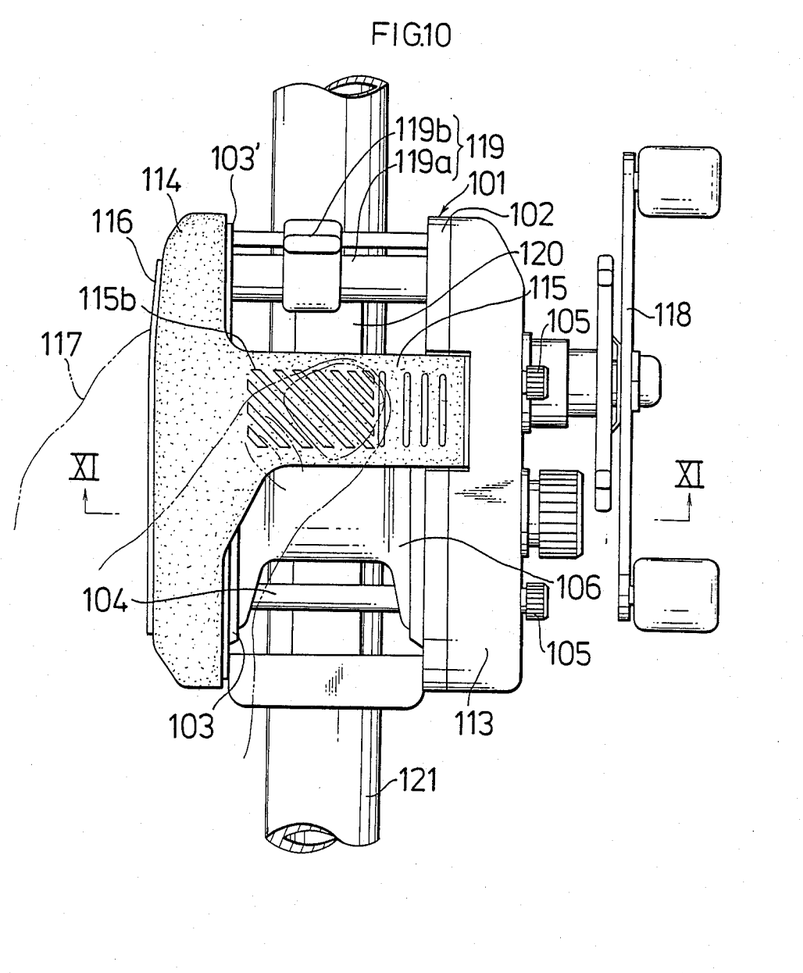
FIG. 10 is a top plan view of a sixth embodiment of a twin-bearing type fishing reel constructed in accordance with and embodying the present invention.
Figure 11:
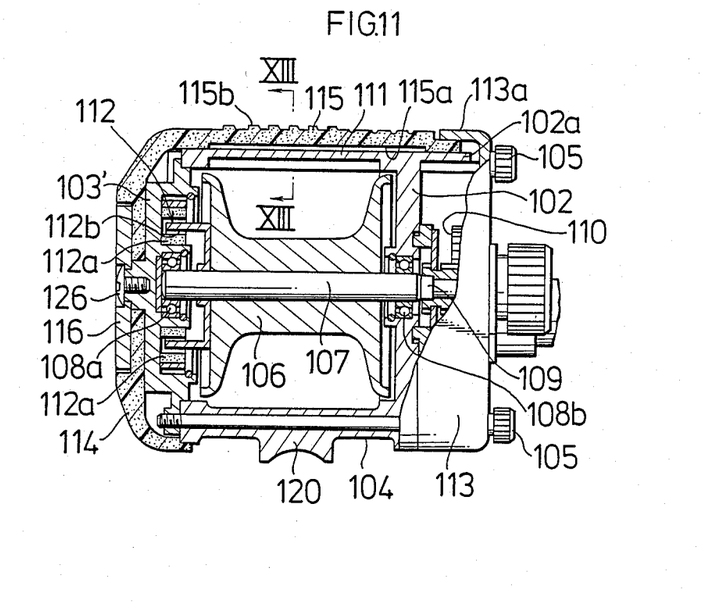
FIG. 11 is a horizontal sectional view taken on the line XI—XI of FIG. 10.
Figures 12, 13:
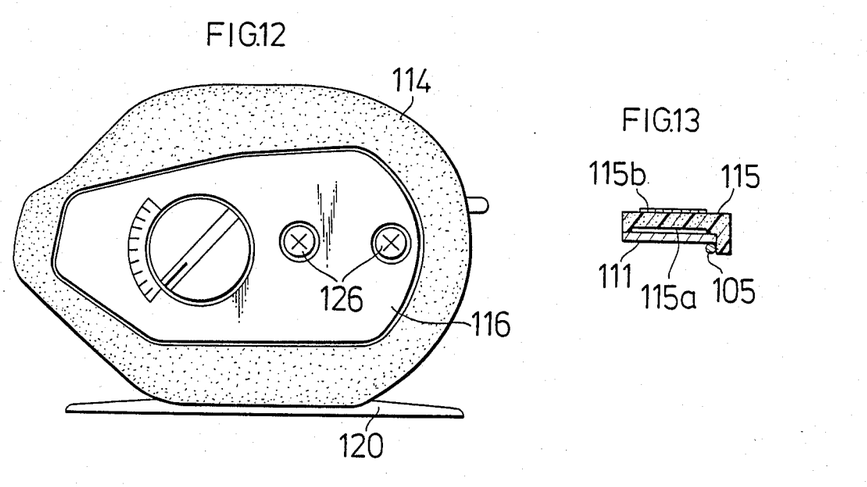
FIG. 12 is a side elevational view taken on the left side of FIG. 10.
FIG. 13 is a vertical sectional view taken on the line XIII—XIII of FIG. 11.
Figure 14:
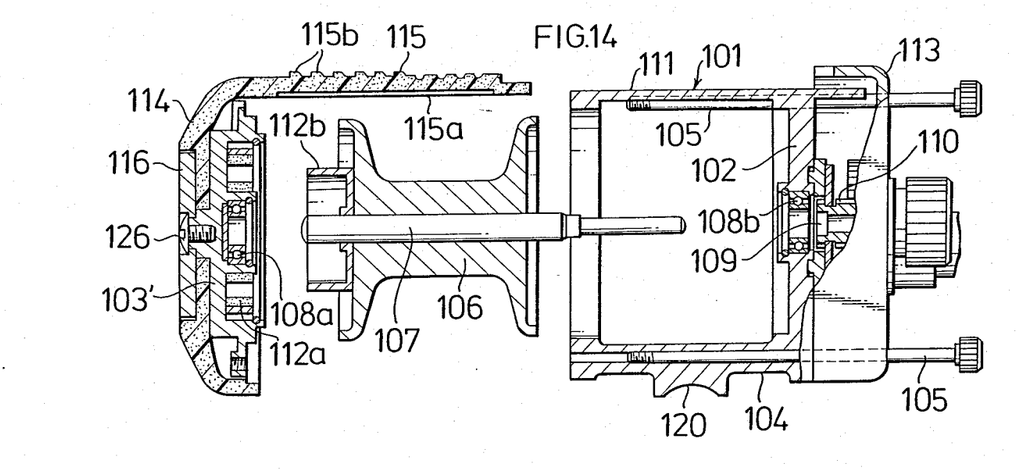
FIG. 14 is an exploded sectional view showing the reel of FIG. 10.

In FIGS. 10, 11 and 14, reference numeral 101 denotes a reel having a handle-side inner plate 102 and an opposite or outer side inner plate 103 in confronting relationship at a predetermined spacing. A plurality of struts 104 are integrally formed with, for extension between, the plates 102 and 103. A dish-shaped holding case 103' is nonrotatably and detachedly engaged to inner plate 103 by through bolts 105. A spool 106 for winding a fishing line (not shown) is secured between inner frame plate 102 and holding case 103'. A spool shaft 107 is fixed through the core of spool 106 with one end rotatably borne by a bearing 108a which is fitted on the inner side of the holding case 103' whereby shaft 107 may be relatively withdrawn therefrom when holding case 103' is separated or detached. The other end portion of spool shaft 107 is rotatably borne by a bearing 108b which is fitted on the frame plate 102, with said shaft 107 extending therebeyond, outwardly of plate 102, for connection through a clutch 109 to a drive gear train 110. Reference numeral 111 denotes a plate-shaped finger rest which is formed above spool 106 with a forward offset from the spool core and extending across the plates 102, 103. Numeral 112 denotes a brake for preventing backlash of the fishing line wound on spool 106. Brake 112 is composed of: a magnet 112a which is arranged in the form of a ring on the inner side of holding case 103', and a non-magnetic drum 112b fixed on spool shaft 107 and rendered rotatable in the magnetic flux of magnet 112a.

113 designates a handle-side outer plate which is attached to cover the outer side of inner plate 102. Outer plate 113 is fixed to inner plate 102 by means of through bolts 105 and screws (not shown). 114 denotes an opposite-side plate which covers inner plate 103. Plate 114 is integrally molded of a soft material such as polyester, urethane or olefin, which will fit comformingly to the palm and the finger and provide a soft cushion. Plate 114 is detachably attached to inner plate 103 by means of a holding plate 116 and a plurality of screws 126. Moreover, plate 114 is formed integrally with a rest cover 115 which is made of the same material to cover finger rest 111. The normally free end of rest cover 115 is sandwiched between the outer circumferential edges 113a and 102a of handle-side outer plate 113 handle-side inner plate 102, respectively. The back or under portion of rest cover 115, confronting with finger rest 111, is formed with a recess 115a opening toward rest 111 which corresponds to the portion to be hooked by the user's thumb of a hand 117, whereas the surface is formed with a number of oblique ridges 115b for providing adequate friction to effect slippage of the thumb.

In FIG. 10, moreover, reference numeral 118 denotes a handle which is hinged to the handle-side plate 113 for winding the fishing line. Turn of handle 118 is transmitted through the drive gear train 110 to the spool shaft 107 and later-described level winder 119, which latter is composed of: a guide sleeve 119a fixedly disposed between inner plates 102, 103 and a fishing line guide member 119b so attached to the guide sleeve 119a as to reciprocate in axial directions.

The soft material to be used for molding plate 114 and rest cover 115 is a thermoplastic elastomer within the polyester, urethane, olefin, styrene, vinyl chloride and rubber groups. Elastomers from these groups are all well-known in the art and the elastomers which would be suited for the present invention are myriad and are known to those skilled in the art. The following is merely indicative of the ready availability of such elastomers. The polyester group is known under the trade names of Toray, Du Pont and Toyobo. The urethane group is known under the trade names of Nippon and Takeda Yakuhin. The olefin group is known under the trade names of Mitsubishi Yuka, Mitsui Sekiyu Kagaku and Mitsubishi Monsanto. The styrene group is known under the trade names of Aron Kasei (Elastomer AR), Asahi Kasei and Mitsubishi Yuka. The vinyl chloride group is known under the trade names of Nippon Zeon and Toa Gosei Kagaku (Aron NP). The rubber group is known under the trade names of Shinetsu Silicone (Silicone Rubber), Showa Neoprene (Chloroprene Rubber) and Du Pont (Fluororubber).

In case a fish is to be landed by the twin-bearing type fishing reel thus constructed according to the present embodiment, the reel is gripped by hooking the four fingers of the left hand other than the thumb on a fishing rod 121 to which the reel is attached through a leg 120 while applying the palm to the plate 114, and by hooking the tip of the thumb 117a of the left hand 117 on ridges 15b of rest cover 115. Thus, the palm and thumb contact the soft thermoplastic elastomeric material of plate 114 and cover 115. As a result, the palm and thumb 117a snugly and comfortably conformingly fit plate 114 and the rest cover 115 so that the pleasant softness thereof can be enjoyed. As a result, in the event the reel is gripped relatively strongly, the soft material elastically deforms commensurate with the pressure applied so that the fit of the palm and the thumb to the reel provides greatly improved grippability of the reel. Since the reaction against the gripping force exerted by hand is absorbed by the soft material of construction, the palm, especially the ball and bulb of the thumb, pressing strongly against plate 114, will not experience pain so that the reel may be comfortably gripped for a relatively long time.

Since, moreover, the back of rest cover 115, to be hooked by the thumb 117a, is formed with recess 115a, cover 115 will be depressed when it is engaged on the outer surface thereof, effecting an improved thumb fit and eliminating slippage from cover 115 thereby comprising the grippability of the reel.

As a result, the winding action during line fishing may be so easily and accurately accomplished as to permit coping sufficiently with the landing of a fish and to improve the windability of the fishing line while avoiding any slippage of the hand, which would cause the reel and the rod to be dropped during the winding action Even if the hand grips the reel for a long time, it will not be subjected to pain or swelling, and will be far less relatively exhausted.

Since shocks from the outside can be absorbed and damped by making plate 114 of soft material as aforesaid, the internal mechanism of the reel is concurrently protected against malfunction or disorder as might result from such shocks.

In the event through bolts 105 are loosened and are displaced, as shown in FIG. 14, holding case 103' including soft plate 114 is separated from reel frame 101 and plate 113; and spool 106 is also detached so that a change of the fishing line can be accomplished for each spool 106.

Figure 15:
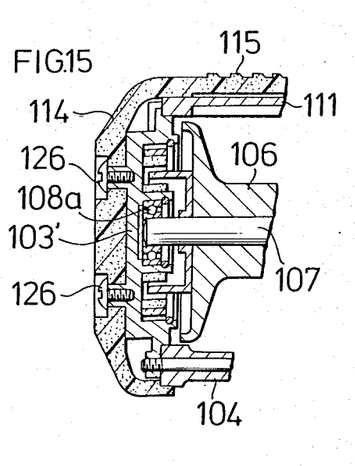
FIG. 15 is a fragmentary vertical sectional view illustrating a portion of a seventh embodiment of a twin-bearing type fishing reel constructed in accordance with and embodying the present invention.

FIG. 15 shows the seventh embodiment of the twin-bearing type fishing reel of the present invention, which differs from the foregoing sixth embodiment in that soft plate 114 is attached directly to holding case 103' by means of screws 126. This embodiment can attain effects similar to those of the sixth embodiment.

Figure 16:
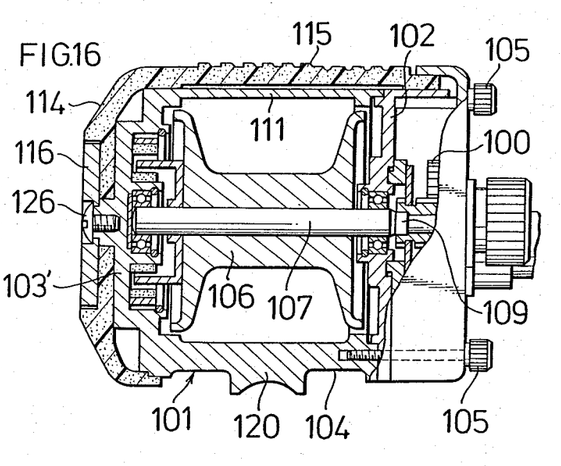
FIG. 16 is a sectional view illustrating an eighth embodiment of a twin-bearing type fishing reel constructed in accordance with and embodying the present invention.

On the other hand, FIG. 16 shows the eighth embodiment of the twin-bearing type fishing reel of the present invention, which is different from the foregoing individual embodiments in that opposite-side inner plate 103, holding case 103' and struts 104 are integrally molded and in that handle-side inner plate 102 can be detached from reel frame 101, so that the spool 106 including shaft 107 can be inserted, or withdrawn, through the handle side.

Naturally, this embodiment can also attain effects similar to the aforementioned ones.

In the present invention, the back or underface of rest cover 115 may be formed without recess 115a.

As has been described hereinbefore, according to the sixth to eighth embodiments of the present invention, the side plate of the reel remote from the handle and the rest cover integrated therewith are molded of a soft material such as a thermoplastic elastomer. This makes it possible to improve the interfit between the palm and thumb and such outer plate and the rest cover, thereby assuring comfort while improving the fit. Accordingly, the grippability of the reel can be improved to remarkably reduce the pain and fatigue of the hand which had been expected heretofore, and thus allow the reel to be easily gripped for a long time.

Figure 17:
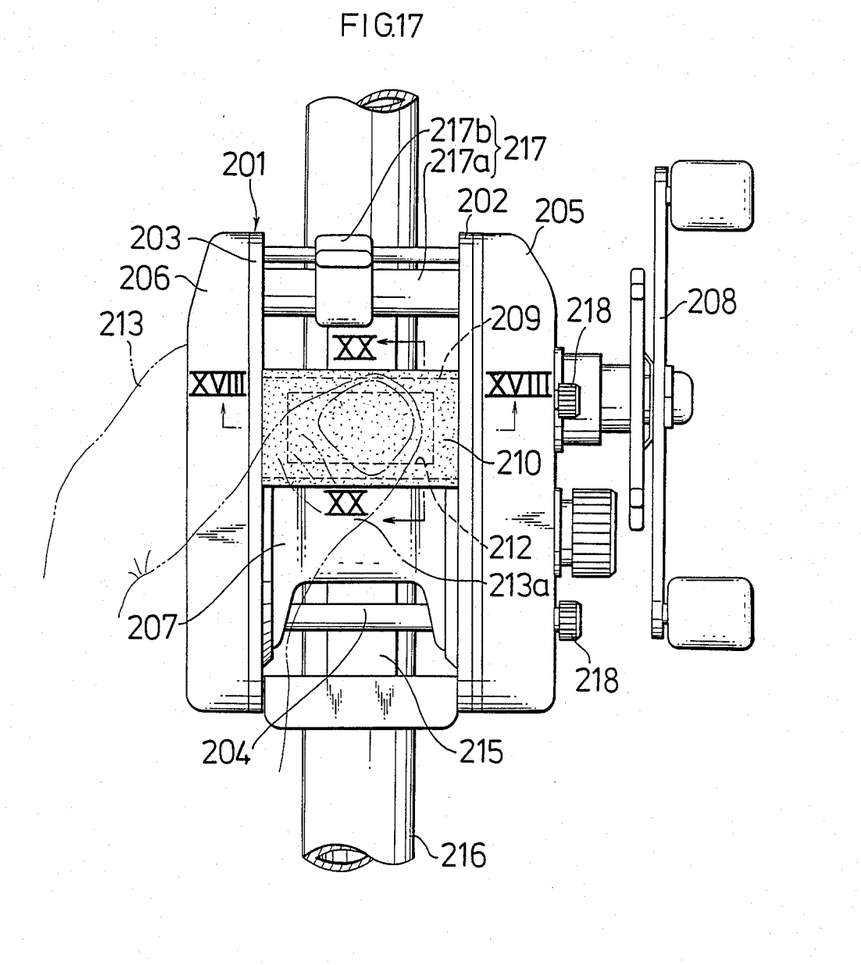
FIG. 17 is a top plan view of a ninth embodiment of a twin-bearing type fishing reel constructed in accordance with and embodying the present invention.
Figure 18:
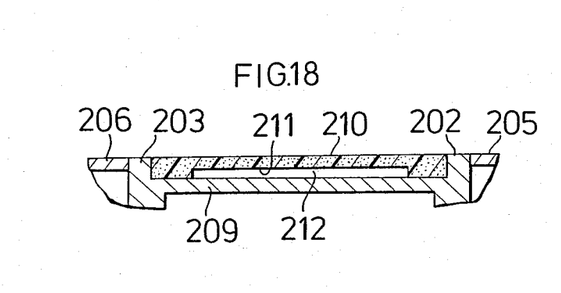
FIG. 18 is an enlarged transverse sectional view taken on the line XVIII—XVIII of FIG. 17.
Figure 19:
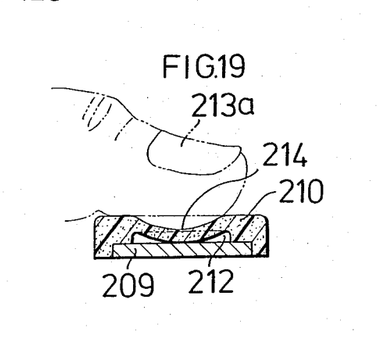
FIG. 19 is a sectional view illustrating the finger rest and finger cover shown in FIG. 18 in operative condition.

FIGS. 17 to 19 show the ninth embodiment of the twin-bearing type fishing reel according to the present invention wherein reference numeral 201 denotes a reel frame which is comprised of: a handle-side inner plate 202 and an opposite-side inner plate 203 arranged in planar parallel confronting relationship and with a predetermined spacing therebetween; and a plurality of struts 204 bridging inner plates 202 and 203. To plates 202 and 203, there are attached, respectively, outer plates 205 and 206 for covering the outer sides of said plates 202 and 203. Numeral 218 denotes through bolts for securing plates 205, 206 to reel frame 201.

207 designates a spool disposed in reel frame 201 and is rotatably supported between plates 202, 203. Numeral 208 denotes a handle which is rotatably supported on the outer plate 205. The revolutions of handle 208 are transmitted to spool 207 through a known drive gear train and a clutch (neither of which are shown) disposed in outer plate 205.

209 designates a plate-shaped finger rest which forms an essential component being arranged with a forward offset from the upper surface of spool 207 and between plates 202 and 203 and with the opposite ends integrated with plates 202 and 203. To finger rest 209 there is fixed, by means such as an adhesive, a rest cover 210 which is molded of an elastic, soft material, such as a thermoplastic elastomer, for covering the upper surface and the longitudinally extending side edges of finger rest 209. Rest cover 210 is formed, in its back or undersurface disposed on the upper surface of finger rest 209, with an inwardly opening recess 212 which extends in the longitudinal direction between finger rest 209 and the rest cover 210. When the upper surface of rest cover 210 is depressed by the tip of the thumb 213a of one's hand 13, a dimple-like depression 214 is formed for preventing slippage.

In FIG. 17., reference numeral 215 denotes a reel leg which is integrally formed in the lower-side strut 204 of reel frame 201 for attaching the reel to a fishing rod 216, and 217 designates a level winder which is disposed in the front side of reel frame 201. Level winder 217 is composed of a guide sleeve 217a, which is fixed across plates 202, 203, and a fishing line guide member 217b which is so attached to guide sleeve 217a as to reciprocate axially.

In the event a fish is to be landed by the twin-bearing type fishing reel of the present embodiment thus constructed, the reel is gripped in its entirety, as shown in FIG. 17, by hooking the four fingers of the left hand 213 other than the thumb 213a on the fishing rod 216 while applying the palm to plate 206, and by hooking the tip of the thumb 213a on the upper surface of soft rest cover 210. At this time, by the pressure of the thumb 213a on rest cover 210 the latter is depressed profiling the bulb of the thumb's tip, as shown in FIG. 19, to form the depression 214 which will stop any slippage of the thumb 213a from rest cover 210 to ensure a proper, reliable grip of the reel. At the same time, soft rest cover 210 elastically deforms in accordance with the pressure of the thumb 213a so that the thumb 213a can feel the soft, comfortable surface and thereby accept the conformance of the finger rest including rest cover 210. This makes it possible to stabilize and ensure the grippability of the reel and to remarkably reduce finger pain and fatigue.

So long as the hooking position of rest cover 210 by the thumb 213a is located so as to face recess 212, the slippage preventing depression 214 is formed in any portion of that area by the pressure of the thumb 213a. As a result, rest cover can accommodate to the size of the fisherman's hands and the length of his thumbs so that his fingers can be hooked in a natural position on the rest cover to eliminate finger pain, discomfort and fatigue.

This makes it possible to conduct the lure fishing action easily and effectively, to strike the fish exactly, and to grip the reel satisfactorily without any dropping.

Figure 20:
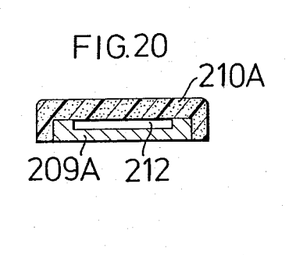
FIG. 20 is a transverse sectional view taken substantially on the line XX—XX of FIG. 17 but illustrating the finger rest and the finger cover of a tenth embodiment of a twin-bearing type fishing reel constructed in accordance with and embodying the present invention.

FIG. 20 shows the tenth embodiment of the finger hooking mechanism of the twin-bearing type fishing reel of the present invention which is different from the foregoing ninth embodiment in that the recess 212 is developed by forming a finger rest 209A in a shallow channel shape and by adhering to the same a rest cover 210A which is devoid of recess 211 but is of concave configuration in cross-section. This embodiment can also provide results similar to those of the foregoing ninth embodiment.

Figure 21:
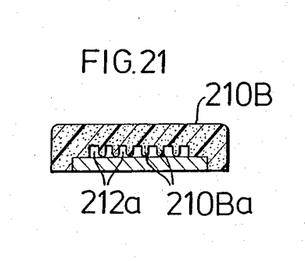
FIG. 21 is a transverse sectional view similar to that taken substantially on the line XX—XX of FIG. 17, but illustrating the finger rest and the finger cover of an eleventh embodiment of a twin-bearing type fishing reel constructed in accordance with and embodying the present invention.

FIG. 21 shows the eleventh embodiment of the finger hooking mechanism of the twin-bearing type fishing reel of the present invention. This embodiment differs from the foregoing ninth embodiment in that a rest cover 210B is formed on its back or undersurface with a plurality of longitudinally extending ridges 210Ba which define a plurality of grooves 212A presented between rest cover 210B and finger rest 209. This embodiment can produce effects similar to those of the foregoing ninth embodiment, but in addition, the depression created by the pressure of the thumb will be of a more stable character than the depression developed by the ninth and tenth embodiments, thereby stabilizing the engagement with the thumb.

Figure 22:
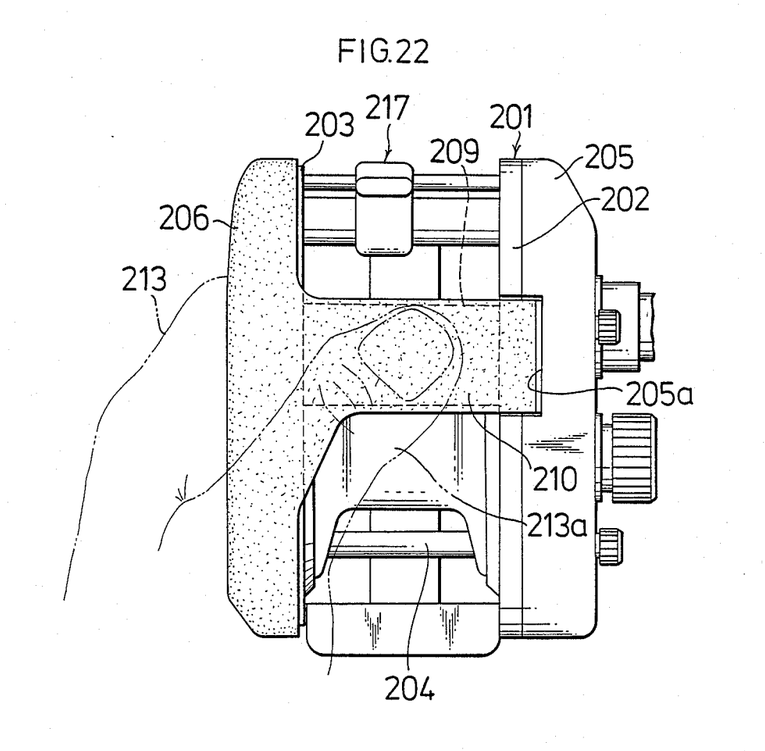
FIG. 22 is a top plan view of a twelfth embodiment of a twin-bearing type fishing reel constructed in accordance with and embodying the present invention.

FIG. 22 shows a twelfth embodiment of the twin-bearing type fishing reel of the present invention. This embodiment is different from the foregoing ninth embodiment in that plate 206 is molded of a soft material similar to that of rest cove 210 and in that rest cover 210 is retained on finger rest 209 by integrating rest cover 210 with outer plate 206; and with the free end of finger rest 210 being retained on the joint portion 205a of plate 205. This embodiment makes it possible to ensure the soft touch and excellent fit even at the portion of plate 206 where the palm of the hand 213 comes into contact, thereby further improving the grippability of the reel.

The shape of the recess 212 formed between the finger rest and the rest cover is not limited to those of the embodiments thus far described.

According to the ninth to twelfth embodiments of the present invention, the rest cover made of the elastic, soft material is fixed on the finger rest formed at the upper surface of the spool of the reel frame, and the recess is formed between the rest cover and the related finger rest so that the dimple-like depression for preventing slippage may be developed when the associated rest cover is depressed by the thumb of the hand gripping the reel. As a result, the slippage preventing depression can be formed when the finger is hooked in a natural manner on the finger rest in full conformity with the size of the fisherman's hand and the length of his fingers, to ensure the grippability of the reel. Since the rest cover is molded of soft material, moreover, there can be attached the effects that soft yielding contact and comfortable interfitting can be attained to allow the reel to be gripped for a long time substantially without pain, discomfort or fatigue.

What is claimed is:

1. A twin-bearing type fishing reel comprising: a reel frame including a handle-side inner plate and an opposite-side inner plate, said plates being arranged in confronting relationship with a predetermined spacing therebetween; a spool borne rotatably in said reel frame; a handle-side outer plate with said handle-side inner plate, a handle for rotating said spool engaged to said handle-side outer plate; and a finger rest fixed between said handle-side and opposite-side inner plates and above said spool, an opposite-side outer plate, means attaching said opposite-side outer plate, and in covering relationship, to said opposite-side inner plate, said opposite-side outer plate being molded of a soft material capable of conforming to the user's hand, and a rest cover overlying said finger rest, the rest cover being formed of the same material as said opposite side outer plate and being integral therewith.

2. A twin-bearing type fishing reel as set forth in claim 1 wherein the soft material is elastically deformable commensurate with pressure, said rest cover being depressable when engaged by thumb pressure.

3. A twin-bearing type fishing reel as set forth in claim 1 wherein the soft hand conformable material is a thermoplastic elastomer.

4. A twin-bearing type fishing reel as set forth in claim 3 wherein the thermoplastic elastomer is from the groups consisting of polyesters, urethanes, olefins, styrenes, vinyl chlorides and rubber.

5. A twin-bearing type fishing reel comprising a reel frame including a handle-side inner plate and an opposite-side inner plate, said plates being arranged in confronting relationship with a predetermined spacing therebetween; a spool borne rotatably in said reel frame; a handle-side outer plate, an opposite side outer plate, means attaching said handle-side outer plate to said handle-side inner plate, means attaching said opposite-side outer plate to said opposite-side inner plate, and a finger rest disposed between and across said inner plates of said reel frame and above said spool, characterized in that a rest cover molded of an elastic, soft material is disposed on said on said finger rest, the finger rest being integrally formed with the opposite-side inner plate and said rest cover being integrally formed with said opposite-side outer plate.

6. A twin-bearing type fishing reel as set forth in claim 5 wherein the portion of said rest cover remote from said opposite-side outer plate is sandwiched between the handle-side outer plate and the handle-side inner plate.

7. A twin-bearing type fishing reel as set forth in claim 5 wherein the rest cover is provided with an upper or outer surface and an under of lower surface, said upper surface being provided with a plurality of spaced-apart ridges.

8. A twin-bearing type fishing reel as set forth in claim 5 wherein the rest cover contains an upper or outer surface and an under or inner surface, said under surface being in confronting relationship to said finger rest, a recess formed on the undersurface of said rest cover and being of such extent as to normally provide a void into which the rest cover may be depressed.

9. A twin-bearing type fishing reel comprising a reel-frame including a handle-side inner plate and an opposite-side inner plate, said plates being arranged in confronting relationship with a predetermined spacing therebetween; a spool borne rotatably in said reel frame; a handle-side outer plate, an opposite side outer plate, means attaching said handle-side outer plate to said handle-side inner plate, means attaching said opposite-side outer plate to said opposite-side inner plate, and a finger rest disposed between and across said inner plates of said reel frame and above said spool, characterized in that a rest cover molded of an elastic, soft material is disposed on said finger rest, the rest cover being provided with an upper or outer surface and a lower or inner surface, and said finger rest is provided with an upper surface in confronting relationship to the lower surface of said rest cover, there being an upwardly extending recess formed in the under surface of said rest cover for developing a void into which the overlying portion of said rest cover may be depressed during usage.

* * * * *

UNITED STATES PATENT AND TRADEMARK OFFICE
CERTIFICATE OF CORRECTION

PATENT NO. : 4,821,978

DATED : Apr. 18, 1989

INVENTOR(S) : K. Kaneko

It is certified that error appears in the above-identified patent and that said Letters Patent is hereby corrected as shown below:

Col. 10, Line 33, after "under" delete "of" and insert --or--.

Signed and Sealed this

Third Day of April, 1990

Attest:

HARRY F. MANBECK, JR.

*Attesting Officer*     *Commissioner of Patents and Trademarks*